United States Patent
Pichumani

(10) Patent No.: US 7,551,777 B1
(45) Date of Patent: Jun. 23, 2009

(54) METHOD AND SYSTEM FOR DISPLAYING LARGE DATA SIGNALS

(75) Inventor: Ramani Pichumani, Palo Alto, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 661 days.

(21) Appl. No.: 11/228,281

(22) Filed: Sep. 19, 2005

(51) Int. Cl.
*G06K 9/00* (2006.01)
(52) U.S. Cl. ...................... 382/168; 382/171
(58) Field of Classification Search ............ 382/100, 382/168, 164, 171, 278, 181; 345/440, 63, 345/69, 207, 418, 442, 18, 16, 690, 428, 345/426, 49; 353/31; 375/E7.089; 702/71; 708/160, 724
See application file for complete search history.

(56) References Cited

U.S. PATENT DOCUMENTS

| | | | | |
|---|---|---|---|---|
| 4,115,863 A | * | 9/1978 | Brown | 345/442 |
| 4,481,605 A | * | 11/1984 | Chase | 708/274 |
| 4,955,063 A | * | 9/1990 | Pierce | 382/168 |
| 5,764,872 A | * | 6/1998 | Koyamada et al. | 345/440 |
| 6,938,060 B2 | * | 8/2005 | Good et al. | 708/160 |

* cited by examiner

*Primary Examiner*—Anh Hong Do
(74) *Attorney, Agent, or Firm*—Rosenberg, Klein & Lee

(57) ABSTRACT

Displaying a large data signal includes processing the input data to generate sets of hierarchical multi-resolution histograms that capture the frequency distribution of the signal, in a single pass. Further, the generation of the sets of hierarchical multi-resolution histograms occurs irrespective of an ordinate range of the signal. Further included is generating display vectors, wherein the sets of hierarchical multi-resolution histograms are used to derive the display vectors when a pre-defined criterion is satisfied.

20 Claims, 9 Drawing Sheets

METHOD AND SYSTEM FOR DISPLAYING LARGE DATA SIGNALS

BACKGROUND

The present invention relates to computer graphics processing and displaying large data signals.

In conventional computerized waveform displays, large waveforms are displayed without considering their density information. A waveform is visually rendered by setting all pixel values the waveform traverses in the display bitmap to an 'on' value, to contrast it with pixel values that are not traversed by the waveform. The on value is set to a pre-defined foreground color value, and the 'off' value to a pre-defined background color value. However, this technique provides only a binary valued indication of where the waveform has traversed. When a long waveform is displayed, the end result is a massive 'blob' of uniform intensity value that envelopes the data. This makes it difficult to ascertain where the signal data spends most of its time within that envelope. Furthermore, it is difficult to identify salient features of the waveform within that envelope.

FIG. 1 illustrates an example display of such a data envelope. The example display illustrates a traditional waveform display of complex, noisy signals, and provides no information for separating the signal from its noise.

Various methods have been used to aid the display of large signal data. One such method includes the visualization of certain types of repetitive signals called 'eye diagrams', by using histogram-intensity mappings. Histograms are computed by using 'bit buckets' that store relative frequency information in static two-dimensional bins. However, the histograms capture a wrapped time period, capturing a repetitive feature of a 'bounded' signal; and do not capture the entire time-span of the signal. Moreover, the histograms do not capture the entire dynamic range of the signal. Further, there is no multi-resolution accuracy; therefore, rapid rendering of very large data signals is not possible.

In light of the foregoing discussion, a need exists for a fast, yet accurate manner of displaying data signals so that it is possible to highlight the salient features of these signals and discern where these signals spend most of their time. The present invention addresses such a need.

SUMMARY

Displaying a large data signal includes processing the input data to generate sets of hierarchical multi-resolution histograms that capture the frequency distribution of the signal, in a single pass. Further, the generation of the sets of hierarchical multi-resolution histograms occurs irrespective of an ordinate range of the signal. Further included is generating display vectors, wherein the sets of hierarchical multi-resolution histograms are used to derive the display vectors when a pre-defined criterion is satisfied.

Through the present invention, very large data signals can be rendered rapidly at any resolution, by extracting only the relevant sets of hierarchical multi-resolution histograms. Further, intensity mapping makes it possible to discern where the data signals spend most of their time. This also helps in differentiating the data signals from their noisy background.

These and other advantages will be more fully appreciated in conjunction with the following detailed description and accompanying drawings.

BRIEF DESCRIPTION OF THE DRAWINGS

Various embodiments of the present invention will hereinafter be described in conjunction with the appended drawings, provided to illustrate and not to limit the present invention, wherein like designations denote like elements, and in which.

DESCRIPTION OF VARIOUS EMBODIMENTS

The embodiments of the present invention relate to a method and a system for displaying large data signals. A rendered screen trace of the data signal is enhanced with histogram-encoded intensity values. The use of hierarchical multi-resolution histograms to encode intensity values makes it possible to discern where a data signal spends most of its time.

Rapid display of the data signals and intensity weights occurs through the use of a compressed data structure that allows multi-resolution display of the data signals in constant time, regardless of their size. A data signal may be rendered at substantially any resolution by extracting only the relevant part of the compressed data structure.

Figure 1:
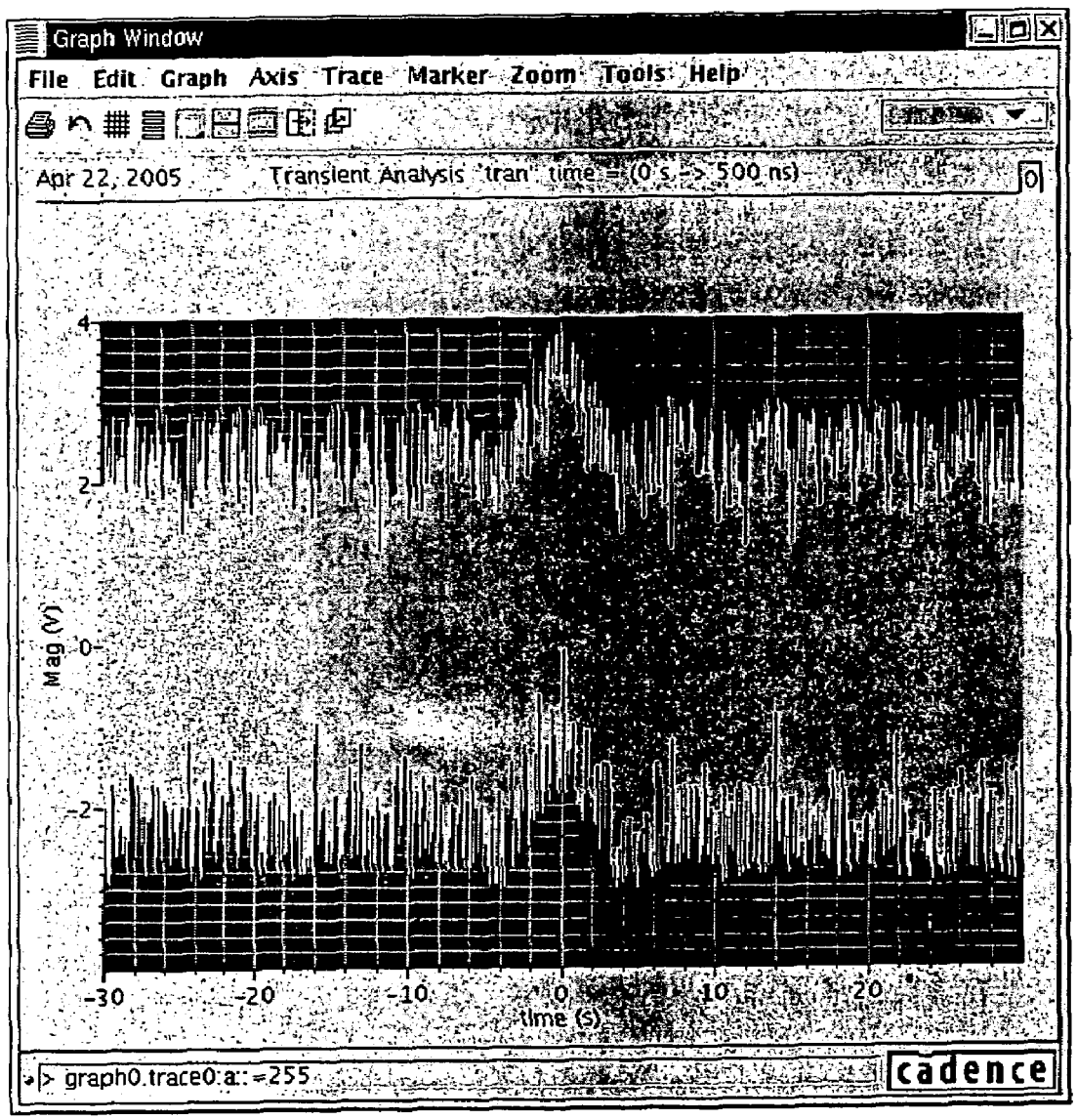
FIG. 1 illustrates an example display of an envelope of uniform intensity value obscuring the data of a complex and noisy signal.
Figure 2:
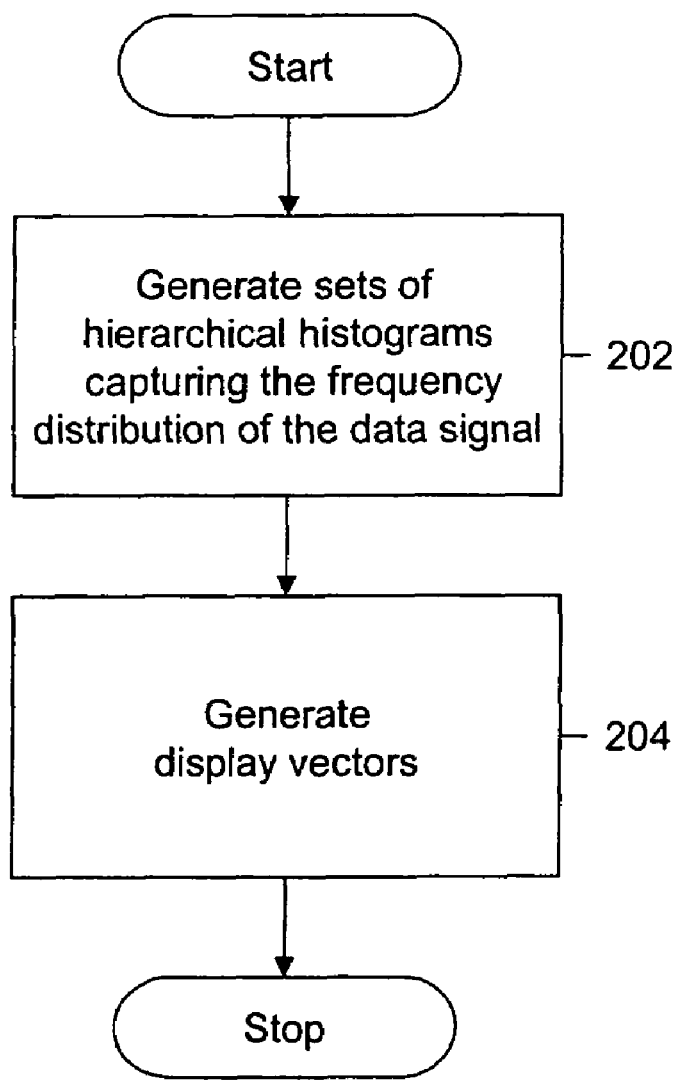
FIG. 2 illustrates a flowchart for displaying data signals, in accordance with various embodiments of the present invention.

FIG. 2 illustrates a flowchart for displaying the data signals, in accordance with various embodiments of the present invention. At act 202, sets of hierarchical multi-resolution histograms are generated from a data signal. These sets of hierarchical multi-resolution histograms capture the frequency distribution of the data signal, in accordance with various embodiments of the present invention. Further, the frequency distribution of the data signal is captured in a single pass and irrespective of an ordinate range of the data signal, in accordance with various embodiments of the present invention. Next, at act 204, display vectors are generated. These display vectors are a sequence of line segments, in which each line segment has an intensity value. The display vectors may be derived from the sets of hierarchical multi-resolution histograms, in accordance with various embodiments of the present invention. The detailed acts, to be performed at act 202 and act 204, are hereinafter described in conjunction with FIGS. 3a and 3b and FIG. 4, respectively.

Figure 3A:
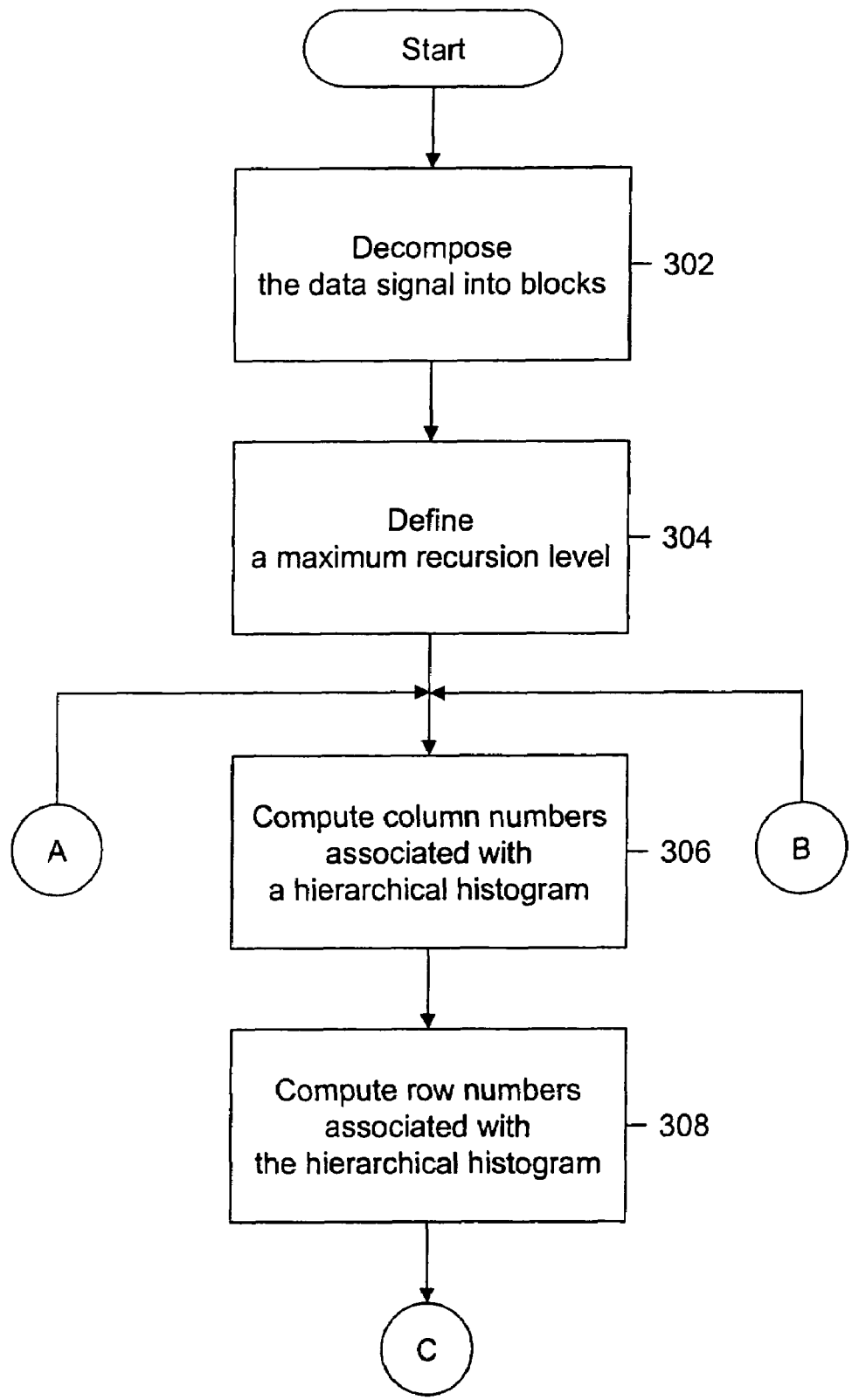
FIGS. 3a and 3b illustrate a flowchart for generating sets of hierarchical multi-resolution histograms from a data signal, in accordance with various embodiments of the present invention.
Figure 3B:
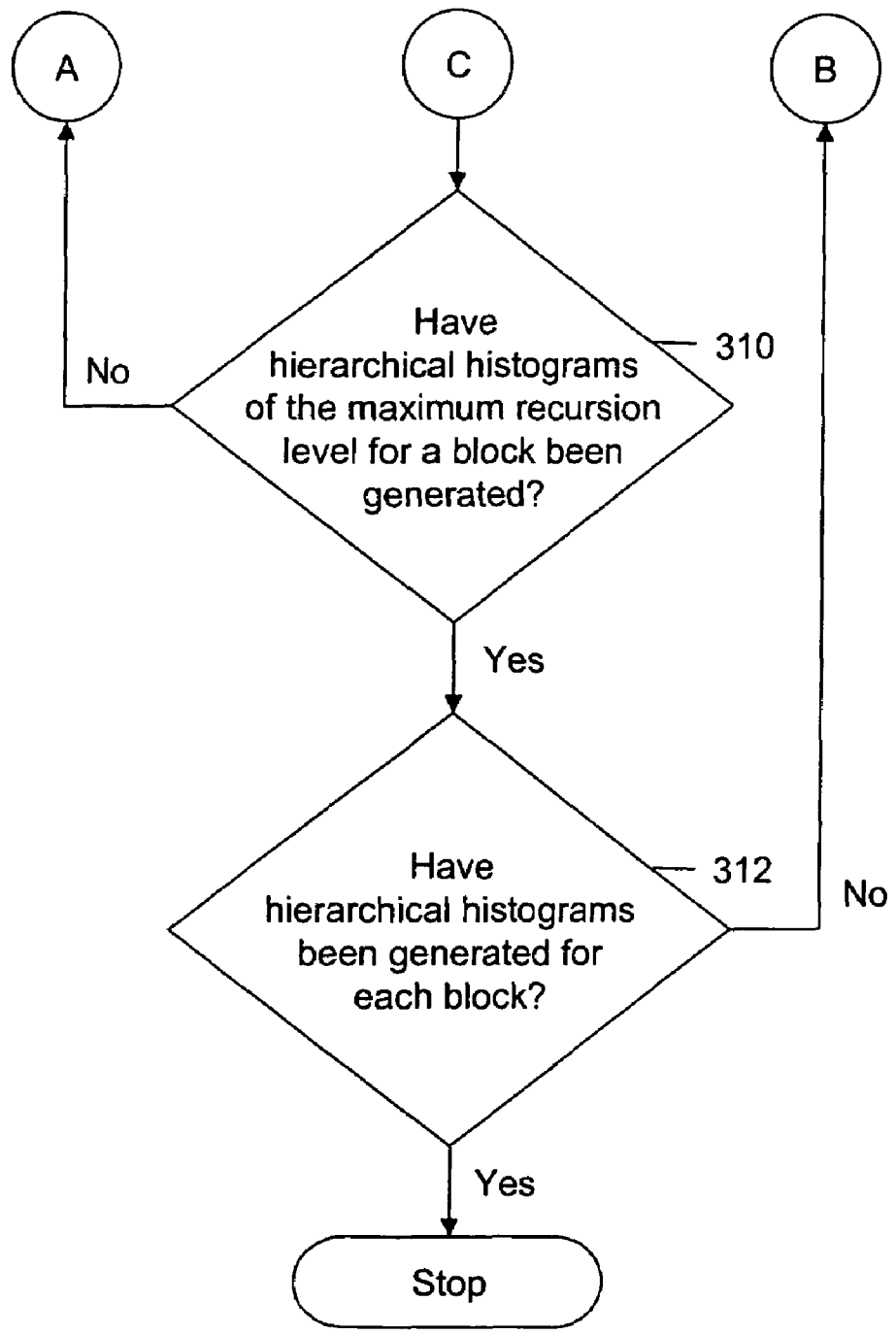

FIGS. 3a and 3b illustrate a flowchart for generating the sets of hierarchical multi-resolution histograms from the data signal (act 202, FIG. 2), in accordance with various embodiments of the present invention. A hierarchical multi-resolution histogram includes a two-dimensional sparse matrix in which each element can be either another hierarchical multi-resolution histogram or a scalar integer frequency bin count, in accordance with various embodiments of the present invention. In accordance with various embodiments of the present invention, each hierarchical multi-resolution histogram has a unique identification tag.

In accordance with various embodiments of the present invention, each hierarchical multi-resolution histogram also contains meta-data fields that store the range of data and the size of the hierarchical multi-resolution histogram. The number of columns and rows may be defined, using the following equations:

$$C_{MAX} = 2\log(\text{MAX\_DOUBLE}) + 1 \quad (1)$$

where

MAX_DOUBLE is the largest representable double precision number. An example value may be $1.0\,e^{+308}$.

$$R_{MAX} = \text{Histogram Precision} \quad (2)$$

where

Histogram Precision is a tunable integer parameter greater than one that specifies the number of bins in a histogram column. An example value may be 256. Higher values of Histogram Precision result in higher precision of the elements of the sparse matrix.

At act 302, the data signal is decomposed into blocks, with each block including a certain number of data points in the data signal. The number of blocks and data points in a block may be user-defined or system-defined, in accordance with various embodiments of the present invention.

At act 304, a maximum recursion level is defined. This maximum recursion level may be computed from a precision level desired by a user, in accordance with various embodiments of the present invention. The maximum recursion level may be user-defined or system-defined, in accordance with various embodiments of the present invention.

A set of hierarchical multi-resolution histograms is generated for each block at each recursion level. At act 306, the column numbers for each data point in a block are computed by using a column number function, in accordance with various embodiments of the present invention. At act 308, the row numbers for each data point in the block are computed by using a row number function, in accordance with various embodiments of the present invention.

The column number and row number functions at each recursion level can be defined as any set of functions that map a real number into a unique element location, in accordance with various embodiments of the present invention. It is to be noted that the mapping should be complete. Further, it should be piecewise consistent, that is, if $y_i > y_k$, and $C\rho(y_i) = C\rho(y_i + 1)$, then $C\rho(y_j) = C\rho(y_i)$ for y such that $y_i \geq y_j \geq y_k$ and if $y_i > y_k$, and $R\rho(y_i) = R\rho(y_i + 1)$, then $R\rho(y_j) = R\rho(y_i)$ for $y_j$ such that $y_i \geq y_j \geq y_k$.

Next, at act 310, it is checked whether the hierarchical multi-resolution histograms of the maximum recursion level of the block have been generated. If they have been generated, act 312 is performed. At act 312, it is checked whether the hierarchical multi-resolution histograms of each block have been generated. If the hierarchical multi-resolution histograms have not been generated for each block, acts 306-310 are performed. If, at act 310, it is found that the hierarchical multi-resolution histograms of the maximum recursion level of the block have not been generated, acts 306 and 308 are performed. The following is an example of acts performed in FIGS. 3a and 3b:

Consider there are 'n' number of data points in the data signal:

$$\{(x_0, y_0), (x_1, y_1), (x_2, y_2), \ldots (x_{n-1}, y_{n-1})\}$$

where $(x_i, y_i)$ represents abscissa and ordinate values of a data point.

At act 302, the n number of data points in the data signal are divided into 'B' number of blocks, so that each block includes 'k' number of data points and $$n = \text{floor}(kB)$$

where floor is a function that returns the floor value of a number.

At act 304, a maximum recursion level $\rho$ is defined, where $\rho = 0$ represents a top-level hierarchical multi-resolution histogram. Acts 306 and 308 are performed for each data point in a block $(x_i, y_i)$ such that $y_i > 0$ at recursion level $\rho$.

At act 306, the column number $C_{\rho i}$ is computed, using the column number function $C\rho_i$, as follows:

$$C_{\rho i} = C_{\rho i}(y_i) = \text{floor}(\log_R y_i) - \text{floor}(\log_R \text{DOUBLE\_EPSILON})$$

where

R is the radix of the logarithmic function, and

DOUBLE_EPSILON is the smallest representable difference between two double precision numbers. An approximate example value may be $2.2\,e^{-16}$.

At act 308, the row number $R_{\rho i}$ is computed, using the row number function $R\rho_i$, as follows:

$$R_{\rho i} = R\rho_i(y_i) = \text{floor}[K \text{frac}(\log_R y_i)] - \text{floor}(\log_R 1/K)$$

where frac is a function that returns the fractional value of a number, and

K is a number that determines the number of bins at each level of recursion.

The value of the number K is chosen to achieve the precision level, depending on the choice of the radix R, in accordance with various embodiments of the present invention. Higher values of K yield a higher number of bins and result in hierarchical multi-resolution histograms of higher resolution.

All the elements $h_{RC}$ of a matrix representing a hierarchical multi-resolution histogram at recursion level $\rho$ are computed in accordance with acts 306 and 308. If $h_{RC}$ is defined to be a scalar, the value of $h_{RC}$ is incremented by 1. If $h_{RC}$ is defined to be a hierarchical multi-resolution histogram, acts 306 and 308 are repeated by using a transformed data point $h_{\rho+1}(y_i)$. This is performed till the maximum recursion level. It is to be noted that for $\rho = 0$, $h_{\rho+1}(y_i) = y_i$, in accordance with various embodiments of the present invention. In accordance with various embodiments of the present invention, a parallel set of hierarchical multi-resolution histograms is generated for all negative values of $y_i$, by using $h_{\rho=0}(y_i) = -y_i$.

At act 310, it is checked whether the hierarchical multi-resolution histograms of the maximum recursion level have been generated. Acts 306-310 are performed for each block. At act 312, it is checked whether the sets of hierarchical multi-resolution histograms have been generated for each block. These sets of hierarchical multi-resolution histograms may be compressed by using data compression, in accordance with various embodiments of the present invention. The sets of hierarchical multi-resolution histograms may be stored in an auxiliary data file, in conjunction with the original and/or compressed data signal information, in accordance with various embodiments of the present invention.

The resolution of the row elements of the sparse matrix can be increased or decreased, depending on the range of the data signal, in accordance with various embodiments of the present invention. Adjacent elements can be folded together into a single element, in accordance with an embodiment of the present invention. For example, if a particular block of data spans only one column and one row, the histogram elements can be re-binned in order to make the binning more precise, without losing the data signal information.

A histogram matrix may be represented as histogram vectors, in accordance with an embodiment of the present invention. Each histogram vector represents the range of data values near $R^c$, where c is the column number in the histogram matrix.

Figure 4:
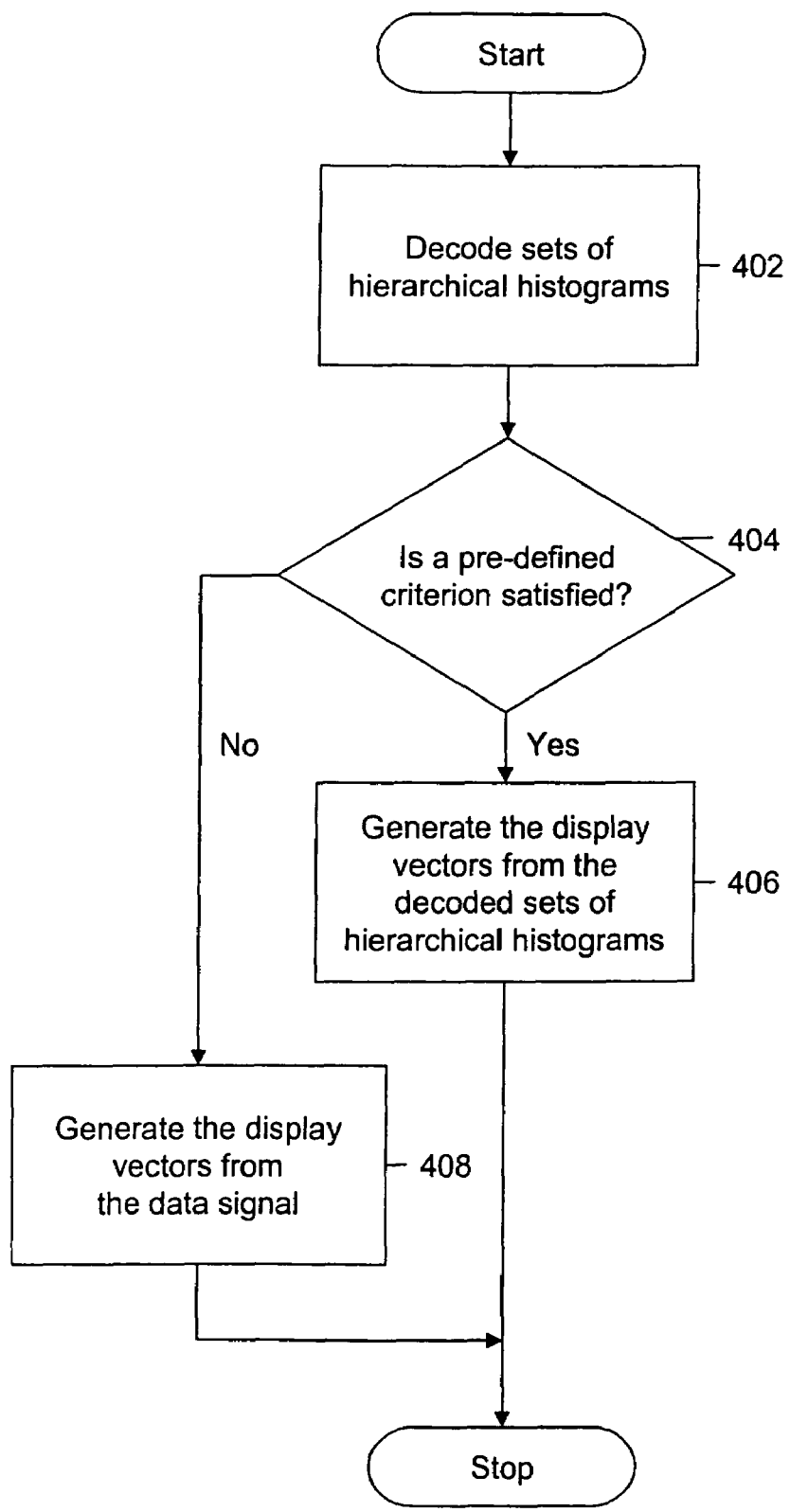
FIG. 4 illustrates a flowchart for generating display vectors, in accordance with various embodiments of the present invention.

FIG. 4 illustrates a flowchart for generating the display vectors (act 204, FIG. 2), in accordance with various embodiments of the present invention. At act 402, the sets of hierarchical multi-resolution histograms are decoded. Decoding the sets of hierarchical multi-resolution histograms involves the use of a recursive descent algorithm, in accordance with various embodiments of the present invention. The recursive descent algorithm starts at the top-level hierarchical multi-resolution histogram and iterates over all of its elements looking for histogram tags. A histogram tag refers to a unique identification tag stored with the data file of the sequential enumeration of matrices for the histogram. When a histogram is an element of a super histogram an entry in the meta-data fields of the data file for the super histogram contains the tag. Here, a super histogram refers to a consolidation of the sets of hierarchical multi-resolution histograms. For each histogram tag encountered, the histogram with that tag is searched for, and once found, a virtual memory address is substituted for the tag. The search procedure is applied recursively for all sub-histograms, until all sub-histograms in the hierarchy have been examined.

Next, at act 404, it is checked whether a pre-defined criterion has been satisfied. The pre-defined criterion includes the resolution of the input data points of the data signal being greater than the resolution provided by the physical display device, in accordance with various embodiments of the present invention. In an example embodiment of the present invention, the pre-defined criterion can include the resolution of the data signal being about 100 times greater than the resolution provided by the physical display device. Of course, this parameter is "tunable" to the particular needs of a given environment. If the pre-defined criterion is satisfied, act 406 is performed. At act 406, the display vectors are generated from the decoded sets of hierarchical multi-resolution histograms.

If, at act 404, it is found that the pre-defined criterion has not been satisfied, act 408 is performed. At act 408, the display vectors are generated from the original data signal. This is performed by using a linear transform, in accordance with various embodiments of the present invention. The display vectors generated from the original data signal have a default constant intensity value.

An example display vector is $(x, y_{min}, y_{max}, I)$,
where
x represents abscissa of a data point, in pixels,
$y_{min}$ represents the minimum ordinate value for x,
$y_{max}$ represents the maximum ordinate value for x, and
I represents the intensity value of line segment connecting the points $(x, y_{min})$ and $(x, y_{max})$.

The intensity value may range from 0 to 255, in accordance with various embodiments of the present invention. The intensity values are proportional to the frequency of the occurrence of the data points in the data signal, in accordance with various embodiments of the present invention.

Figure 5:
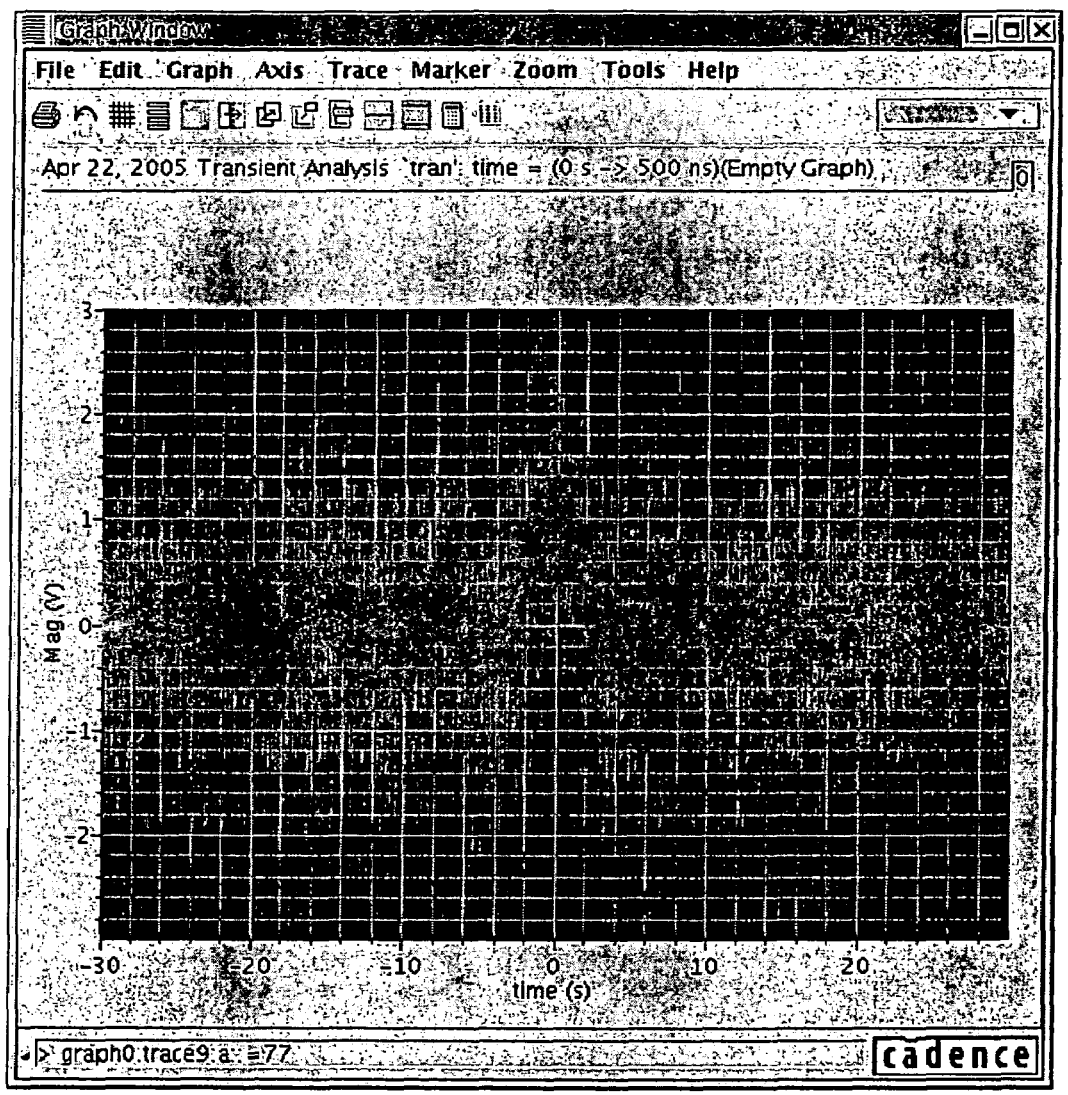
FIG. 5 illustrates an example display of a data signal, in accordance with various embodiments of the present invention.

FIG. 5 illustrates an example display of a data signal, in accordance with various embodiments of the present invention. The data signal is differentiated from a noisy background, by using intensity-mapped histograms.

Figure 6:
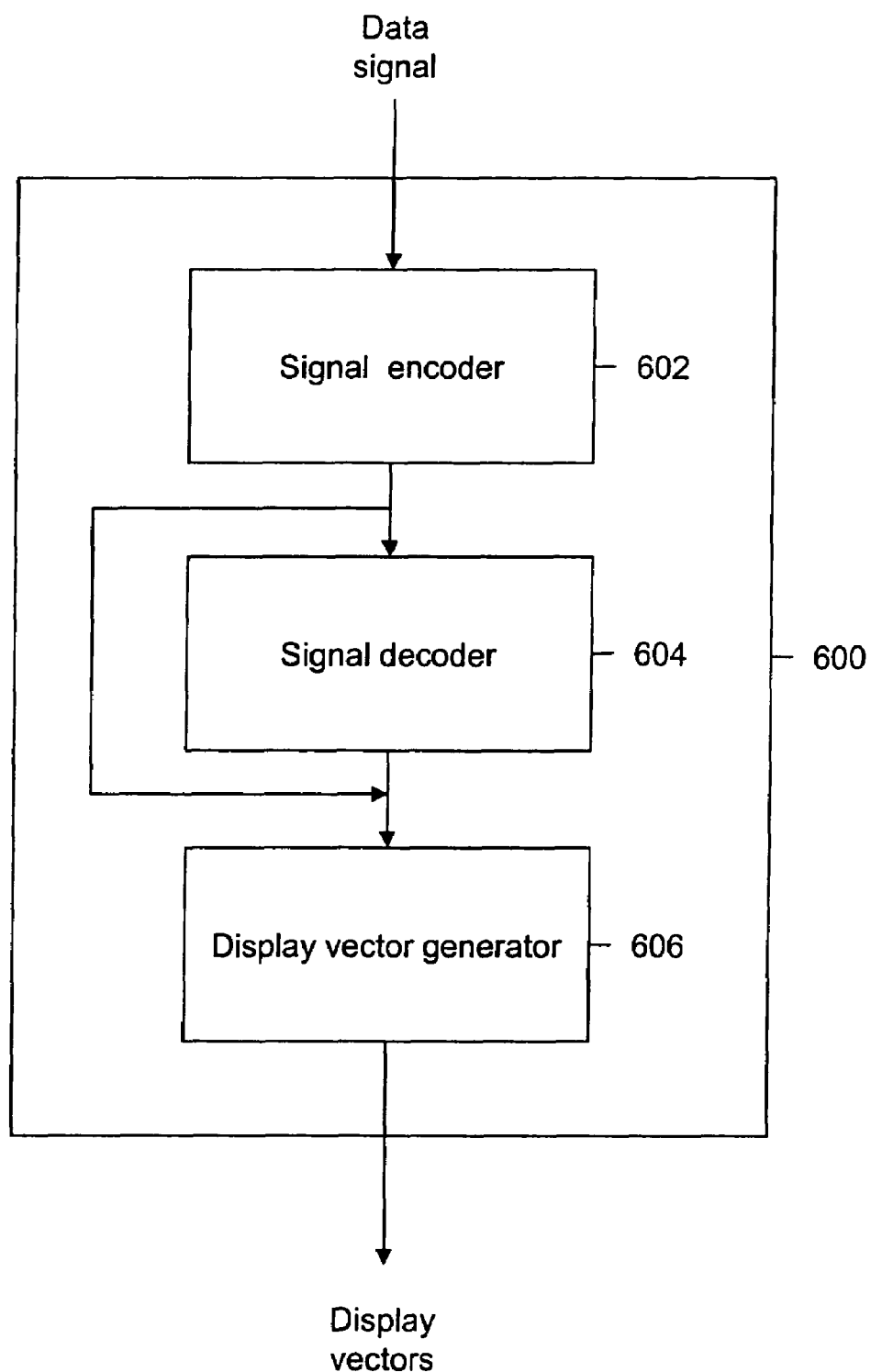
FIG. 6 illustrates a block diagram of various elements of a system for displaying data signals, in accordance with various embodiments of the present invention.

FIG. 6 illustrates a block diagram of various elements of a system 600 for displaying the data signals, in accordance with various embodiments of the present invention. System 600 includes a signal encoder 602, a signal decoder 604, and a display vector generator 606.

Signal encoder 602 generates the sets of hierarchical multi-resolution histograms from the data signal. Signal encoder 602 generates these sets of hierarchical multi-resolution histograms in a single pass and irrespective of an ordinate range of the data signal, in accordance with various embodiments of the present invention. In various embodiments of the present invention, signal encoder 602 performs acts 302-312, as shown in FIGS. 3a and 3b. In an embodiment of the present invention, signal encoder 602 can include a data compression block for compressing the sets of hierarchical multi-resolution histograms. In an embodiment of the present invention, signal encoder 602 can include a user interface for the input of one or more of the number of blocks, the maximum recursion level, and the precision level.

Signal decoder 604 decodes the sets of hierarchical multi-resolution histograms. In various embodiments of the present invention, signal decoder 604 performs act 402, as shown in FIG. 4. In an embodiment of the present invention, signal decoder 604 can include a data decompression block for decompressing the compressed sets of hierarchical multi-resolution histograms. The decoded sets of hierarchical multi-resolution histograms obtained from signal decoder 604 may be used by display vector generator 606 to generate the display vectors.

Display vector generator 606 generates the display vectors. The display vectors may be generated from the decoded sets of hierarchical multi-resolution histograms, when the pre-defined criterion is satisfied. Otherwise, the display vectors may be generated from the original data signal. In various embodiments of the present invention, display vector generator 606 performs acts 404-408, as shown in FIG. 4. In an embodiment of the present invention, display vector generator 606 can include a user interface, for the input of the resolution level desired by the user.

Figure 7:
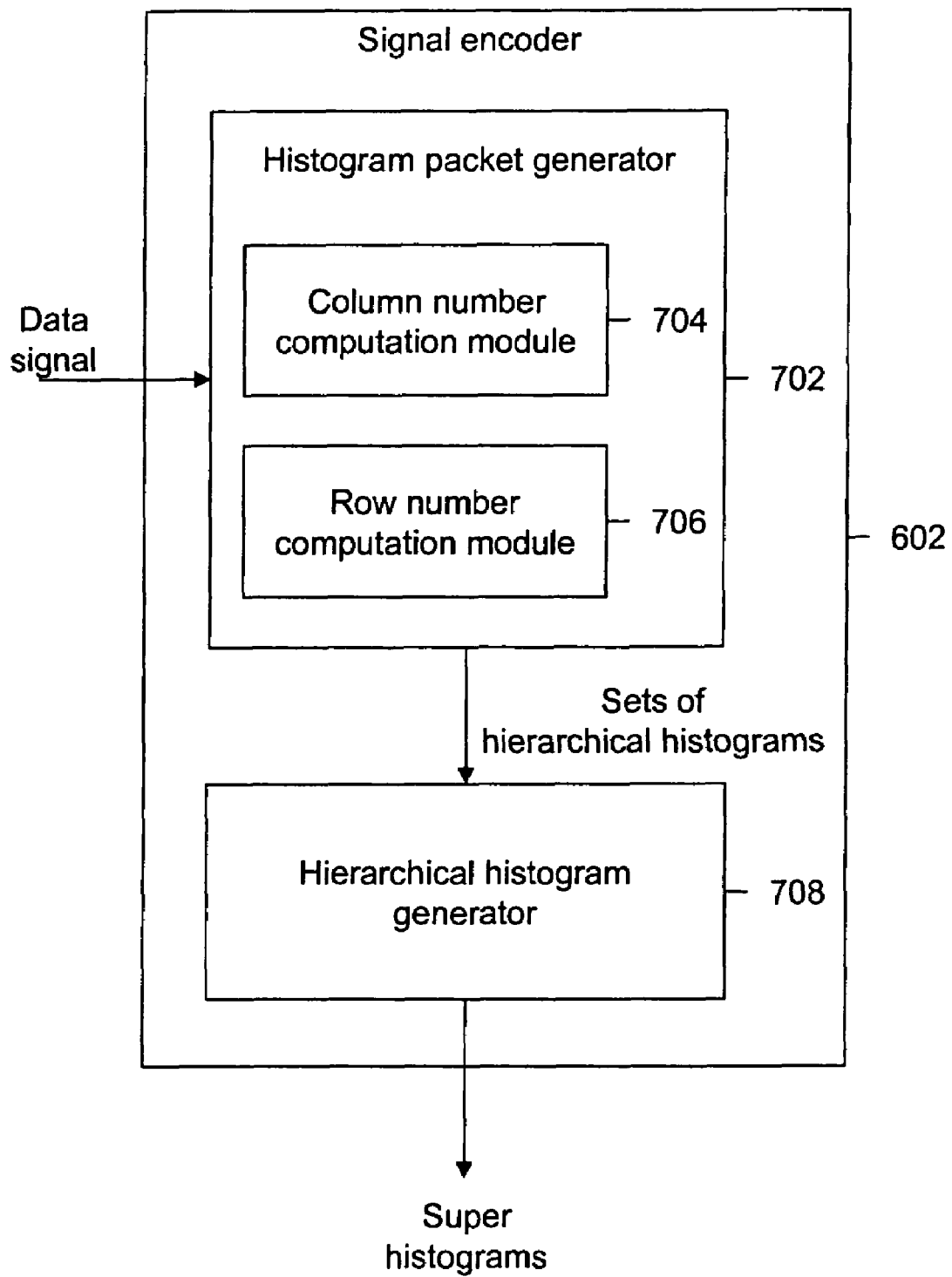
FIG. 7 illustrates a block diagram of various elements of a signal encoder, in accordance with various embodiments of the present invention.

FIG. 7 illustrates a block diagram of various elements of signal encoder 602, in accordance with various embodiments of the present invention. Signal encoder 602 includes a histogram packet generator 702 and a hierarchical histogram generator 708.

Histogram packet generator 702 decomposes the data signal into blocks and generates one or more sets of hierarchical multi-resolution histograms for each block. Histogram packet generator 702 includes a column number computation module 704 and a row number computation module 706. In various embodiments of the present invention, column number computation module 704 and row number computation module 706 perform acts 306 and 308, respectively. In various embodiments of the present invention, histogram packet generator 702 performs acts 302-312, as shown in FIGS. 3a and 3b.

Hierarchical histogram generator 708 consolidates the sets of hierarchical multi-resolution histograms into super histograms. In accordance with various embodiments of the present invention, the super histograms can be used for generating the display vectors as described in acts 402-406 above.

The super histograms may be generated from the minimum and maximum values of $x_i$ and $y_i$, as follows:

$$Y_{maxi} = \max(H_{j+0}(y_{max}), H_{j+1}(y_{max}), \ldots, H_{j+k-1}(y_{max})),$$
where $0 <= j <= B$ $$Y_{mini} = \min(H_{j+0}(y_{min}), H_{j+1}(y_{min}), \ldots H_{j+k-1}(y_{min}))$$

where k represents the number of data points in a block, and

B represents the number of blocks.

The minimum and maximum values may be recorded while generating the sets of hierarchical multi-resolution histograms, in accordance with various embodiments of the present invention. In accordance with various embodiments of the present invention, the information about the frequency of occurrence can be aggregated by recursively summing all counts across individual leaf elements with identical bin definitions. The super histograms can be used to display the data signals at large zoom-out values, in accordance with various embodiments of the present invention.

It is to be noted that the super histograms may be further re-binned to prevent them from growing excessively large in size, in accordance with various embodiments of the present invention. The re-binning can be performed by using column bins or row bins, in accordance with various embodiments of the present invention.

Figure 8:
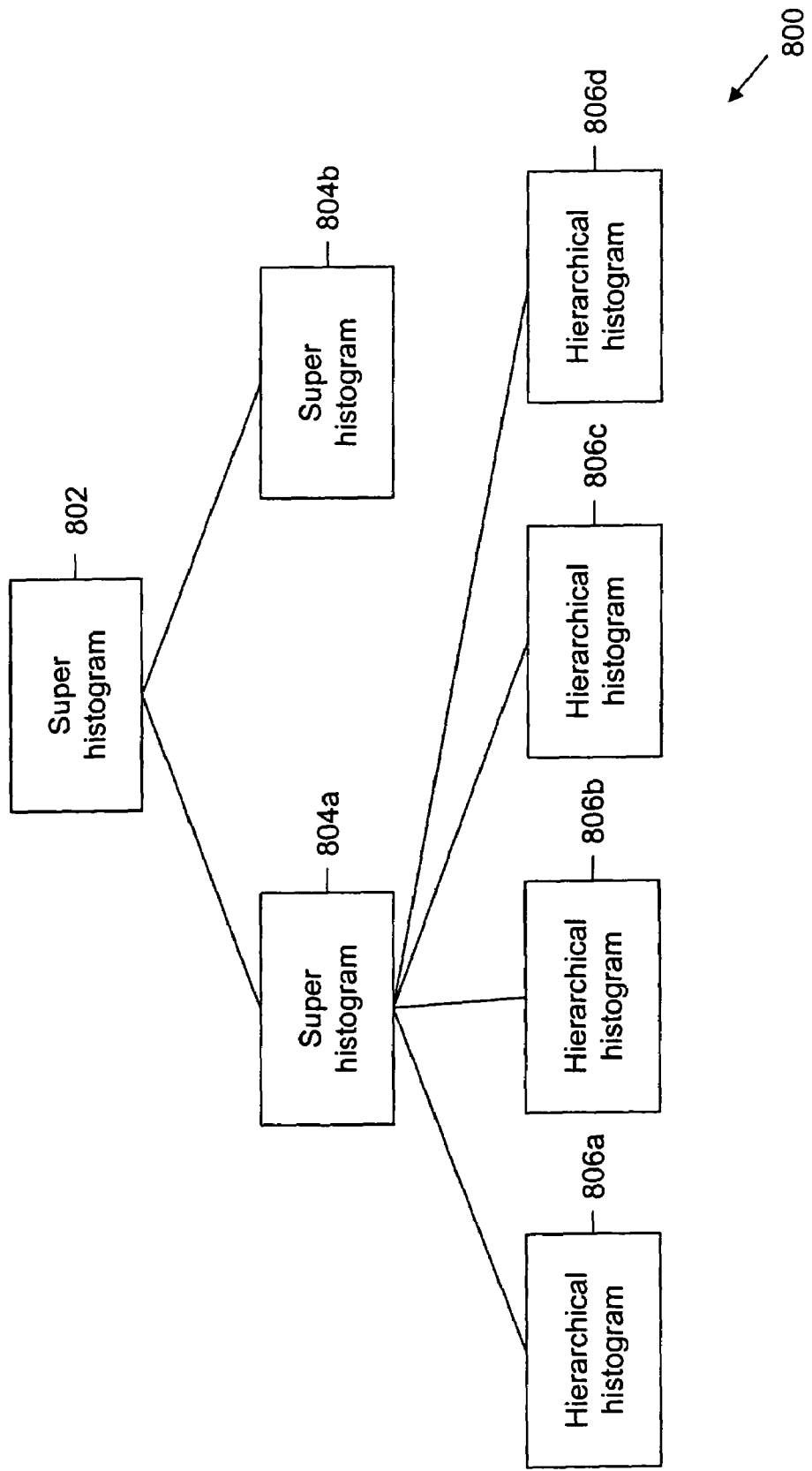
FIG. 8 illustrates a tree structure of super and hierarchical multi-resolution histograms, in accordance with various embodiments of the present invention.

In accordance with various embodiments of the present invention, a binary-tree may be used as the compressed data structure, to store the sets of hierarchical multi-resolution histograms and super histograms. FIG. 8 illustrates a tree structure 800 of super and hierarchical multi-resolution histograms, in accordance with various embodiments of the present invention.

Each node in tree structure 800 contains a higher-order super histogram that consolidates the sets of hierarchical multi-resolution histograms of all the sub-trees. Consider, for example, that a super histogram 804*a* consolidates the sets of hierarchical multi-resolution histograms 806*a*, 806*b*, 806*c* and 806*d*. Further, a super histogram 802 consolidates super histograms 804*a* and 804*b*.

In this manner, a data signal can be rendered rapidly at any resolution by extracting only the relevant sets of hierarchical multi-resolution histograms or super histograms. Thus, rapid rendering of very large data signals, with multi-resolution accuracy, is possible.

Further, the sets of hierarchical multi-resolution histograms are generated rapidly in a single pass, in real-time. Single-pass data analysis for processing large data signals greatly reduces overhead on computer I/O subsystems, yielding significantly higher data throughput rates.

Moreover, the generation of the sets of hierarchical multi-resolution histograms does not require any a priori knowledge of the abscissa or ordinate ranges. This allows these sets of hierarchical multi-resolutions histograms to be generated concurrently with signal generation or acquisition, without requiring retrospective analysis of the signal data.

Further, the hierarchical multi-resolution histograms provide the intensity mapping, making it possible to discern where signals spend most of their time. These hierarchical multi-resolution histograms facilitate a display with alpha-blended pixel intensity, which, in turn, provides a clearer display of the data signal. This also helps in differentiating the data signals from their noisy background. In addition, this allows dense signals and multiple signals with overlap to be displayed more clearly.

Further, the use of hierarchical multi-resolution histograms makes it possible to highlight the salient features of the data signals, thus providing digital "brightness", "contrast", and "threshold" features. In this manner, the virtual rendering of a signal simulates what a user might see on an oscilloscope when the intensity of the traces at any given x-y coordinate is directly proportional to the amount of time that a signal spends at or near that coordinate location. Less frequent signal pattern can be de-emphasized and dominant signal patterns can be emphasized. Further, non-linear mappings between the histogram data and intensity weights can be performed to emphasize or de-emphasize specific regions of the data signals.

Furthermore, these hierarchical multi-resolution histograms capture the entire time span of the signal. Further, these hierarchical multi-resolution histograms capture the entire dynamic range of the signal. The generation of the display vectors from the relevant sets of hierarchical multi-resolution histograms and super histograms does not necessitate reading the entire data signal.

Moreover, these hierarchical multi-resolution histograms can be used to perform data-driven compression of the data signals. Thus, the overall size of a data signal can be significantly reduced.

The system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices capable of implementing the acts constituting the method of the present invention.

The computer system comprises a computer, an input device, a display unit, the Internet, and a microprocessor. The microprocessor is connected to a communication bus. The computer also comprises a memory, which may include Random Access Memory (RAM) and Read Only Memory (ROM), as well as a storage device, which can be a hard disk drive or a removable storage drive such as a floppy disk drive, optical disk drive, and so forth. The storage device can also be other similar means for loading computer programs or other instructions into the computer system.

The computer system executes a set of instructions that are stored in one or more storage elements, in order to process input data. These storage elements may hold data or other information, as desired, and may also be in the form of an information source or a physical memory element in the processing machine.

The set of instructions may include various commands that instruct the processing machine to perform specific tasks, such as the acts constituting the method of the present invention. The set of instructions may be in the form of a software program, and the software may be in various forms, such as system software or application software. Further, the software may be in the form of a collection of separate programs, a program module with a larger program, or a portion of a program module. The software may also include modular programming in the form of object-oriented programming. The processing of input data by the processing machine may be in response to user commands, to results of previous processing, or in response to a request made by another processing machine.

While various embodiments of the present invention have been illustrated and described, it will be clear that the present invention is not limited only to these embodiments. Numerous modifications, changes, variations, substitutions and equivalents will be apparent to those skilled in the art, without departing from the spirit and scope of the present invention, as described in the claims.

What is claimed is:

1. A method for displaying observed waveform data signals, the method comprising:
   using a signal encoder for generating sets of hierarchical multi-resolution histograms from an observed waveform data signal, wherein the sets of hierarchical multi-resolution histograms capture the frequency distribution of the observed waveform data signal in a single pass and irrespective of an ordinate range of the observed waveform data signal;
   using a display vector generator for generating display vectors comprising a sequence of line segments in which each line segment has an intensity value, wherein the sets of hierarchical multi-resolution histograms are used to derive the display vectors when a pre-defined criterion is satisfied; and
   using a physical display device for displaying said display vectors representing said observed waveform data signal.

2. The method according to claim 1, wherein generating the sets of hierarchical multi-resolution histograms comprises:
   decomposing the observed waveform data signal into blocks; and
   generating a set of hierarchical multi-resolution histograms for each block.

3. The method according to claim 2, wherein generating the set of hierarchical multi-resolution histograms for each block comprises:
   computing column numbers associated with a hierarchical multi-resolution histogram, wherein the column number is computed using a column number function; and
   computing row numbers associated with the hierarchical multi-resolution histogram, wherein the row number is computed using a row number function;
   wherein the above steps are performed recursively until a pre-defined maximum recursion level is reached.

4. The method according to claim 3, wherein the column number and row number functions at each recursion level further comprise a set of functions that map a real number into a unique element location in a complete and piecewise consistent manner.

5. The method according to claim 4, wherein the column number function comprises a logarithmic function.

6. The method according to claim 4, wherein the row number function comprises a combinatorial function of logarithmic and fractional functions.

7. The method according to claim 1 further comprising consolidating the sets of hierarchical multi-resolution histograms into super histograms, the super histograms being used for rendering data at large zoom out values.

8. The method according to claim 1, wherein generating display vectors comprises:
   decoding the sets of hierarchical multi-resolution histograms; and
   if the pre-defined criterion is satisfied,
   generating the display vectors from the decoded sets of hierarchical multi-resolution histograms;
   else
   generating the display vectors from the observed waveform data signal.

9. The method according to claim 8, wherein the pre-defined criterion comprises the resolution of input data points of the observed waveform data signal being greater than the resolution provided by the physical display device.

10. A system for displaying data signals, the system comprising:
    a signal encoder, the signal encoder generating sets of hierarchical multi-resolution histograms from a data signal, wherein the sets of hierarchical multi-resolution histograms capture the frequency distribution of the data signal in a single pass and irrespective of an ordinate range of the data signal; and
    a display vector generator, the display vector generator generating display vectors from decoded sets of hierarchical multi-resolution histograms when a pre-defined criterion is satisfied.

11. The system according to claim 10, wherein the signal encoder comprises a histogram packet generator, the histogram packet generator decomposing the data signal into blocks and generating a set of hierarchical multi-resolution histograms for each block.

12. The system according to claim 11, wherein the histogram packet generator comprises:
    a column number computation module, the column number computation module computing column numbers associated with a hierarchical multi-resolution histogram; and
    a row number computation module, the row number computation module computing row numbers associated with the hierarchical multi-resolution histogram;
    wherein the column number computation module and the row number computation module operating recursively until a pre-defined maximum resolution level is reached.

13. The system according to claim 11, wherein the signal encoder further comprises a hierarchical histogram generator, the hierarchical histogram generator consolidating the sets of hierarchical multi-resolution histograms into super histograms.

14. The system according to claim 10, wherein the pre-defined criterion comprises the resolution of input data points of the data signal being greater than the resolution provided by a physical display device.

15. The system according to claim 10 further comprising a signal decoder, the signal decoder decoding the sets of hierarchical multi-resolution histograms.

16. The system according to claim 10, wherein the display vector generator further generates the display vectors from the data signal when the pre-defined criterion is not satisfied.

17. A computer program product for use with a computer, the computer program product comprising a computer usable medium having a computer readable program code embodied therein for displaying observed waveform data signals, the computer readable program code comprising:
    providing a system, wherein the system includes distinct software modules, and wherein the distinct software modules include a logic processing module, a hierarchical multi-resolution histogram generating module, a display vector generating module, and a waveform display module;
    generating sets of hierarchical multi-resolution histograms from an observed waveform data signal, wherein the sets of hierarchical multi-resolution histograms capture the frequency distribution of the observed waveform data signal in a single pass and irrespective of an ordinate range of the observed waveform data signal, wherein said generating sets of hierarchical multi-resolution histograms is performed by the hierarchical multi-resolution histogram generating module;

generating display vectors comprising a sequence of line segments in which each line segment has an intensity value, wherein the sets of hierarchical multi-resolution histograms are used to derive the display vectors when a pre-defined criterion is satisfied, said generating display vectors is performed by the display vector generating module; and displaying said display vectors representing said observed waveform data signal, wherein said displaying of said display vectors is performed by the waveform display module.

18. The computer program product according to claim 17, wherein generating the sets of hierarchical multi-resolution histograms further comprises:

decomposing the observed waveform data signal into blocks; and generating a set of hierarchical multi-resolution histograms for each block.

19. The computer program product according to claim 18, wherein generating the set of hierarchical multi-resolution histograms for each block further comprises:

computing column numbers associated with a hierarchical multi-resolution histogram, wherein the column number is computed using a column number function; and computing row numbers associated with the hierarchical multi-resolution histogram, wherein the row number is computed using a row number function;

wherein the above steps are performed recursively until a pre-defined maximum recursion level is reached.

20. The computer program product according to claim 17, wherein generating display vectors further comprises:

decoding the sets of hierarchical multi-resolution histograms; and if the pre-defined criterion is satisfied, generating the display vectors from the decoded sets of hierarchical multi-resolution histograms;

else generating the display vectors from the observed waveform data signal.

* * * * *